(12) United States Patent
Jung et al.

(10) Patent No.: US 8,087,196 B2
(45) Date of Patent: Jan. 3, 2012

(54) DOT SIGHTING DEVICE WITH LARGE CALIBER

(75) Inventors: In Jung, Gyeonggi-do (KR); Dong Hee Lee, Gyeonggi-do (KR)

(73) Assignee: In Jung, Gyeonggi-Do (KR)

( * ) Notice: Subject to any disclaimer, the term of this patent is extended or adjusted under 35 U.S.C. 154(b) by 0 days.

(21) Appl. No.: 12/667,576

(22) PCT Filed: Jul. 3, 2008

(86) PCT No.: PCT/KR2008/003944
§ 371 (c)(1),
(2), (4) Date: Jan. 4, 2010

(87) PCT Pub. No.: WO2009/008629
PCT Pub. Date: Jan. 15, 2009

(65) Prior Publication Data
US 2010/0275495 A1    Nov. 4, 2010

(30) Foreign Application Priority Data

Jul. 6, 2007   (KR) .................. 10-2007-0067861

(51) Int. Cl.
*F41G 1/00* (2006.01)

(52) U.S. Cl. .......................................... 42/113; 42/122

(58) Field of Classification Search .............. 42/90, 122, 42/113
See application file for complete search history.

(56) References Cited

U.S. PATENT DOCUMENTS

| | | | | |
|---|---|---|---|---|
| 5,272,514 | A | * 12/1993 | Dor | 356/251 |
| 5,373,644 | A | 12/1994 | DePaoli | |
| 5,493,450 | A | * 2/1996 | Ekstrand | 359/799 |
| 5,508,843 | A | * 4/1996 | Tomita | 359/428 |
| 5,625,954 | A | 5/1997 | DePaoli | |
| 5,813,159 | A | * 9/1998 | Kay et al. | 42/113 |
| 6,327,806 | B1 | * 12/2001 | Paige | 42/113 |
| 7,234,265 | B1 | * 6/2007 | Cheng et al. | 42/113 |
| 2007/0180751 | A1 | * 8/2007 | Joannes | 42/113 |
| 2009/0265974 | A1 | * 10/2009 | Joannes | 42/113 |
| 2010/0083554 | A1 | * 4/2010 | Elpedes et al. | 42/123 |

* cited by examiner

*Primary Examiner* — Michael Carone
*Assistant Examiner* — Samir Abdosh
(74) *Attorney, Agent, or Firm* — Dority & Manning, P.A.

(57) ABSTRACT

Provided is a dot sighting device with large caliber for binocular vision in which sighting can be performed rapidly and accurately by minimizing parallax. The dot sighting device is attached to and detached from a mount for a heavy machine gun. In addition, by using the dot sighting device with large caliber, a user can rapidly and accurately sight and fire a target by taking into consideration types and characteristics of the target and a distance to the target.

7 Claims, 10 Drawing Sheets

Conic coefficient of R2
0.188564

DOT SIGHTING DEVICE WITH LARGE CALIBER

TECHNICAL FIELD

The present invention relates to a sighting device installed in a heavy machine gun, and more particularly, to a dot sighting device with large caliber for binocular vision.

BACKGROUND ART

Characteristics of a rifle or heavy machine gun are determined according to whether the user wants to rapidly sight and fire and whether the user wants to accurately sight a target. In general, rifles or heavy machine guns sight a target by aligning a line of sight of a rear sight and a front sight. The sighting performed by the aligning of the line of sight of the front sight positioned at an end of a gun barrel and the rear sight positioned at an upper portion of a gun body allows the user to accurately fire according to their ability.

However, when the sighting is performed using both the rear sight and the front sight, it is difficult to align the line of sight due to even small vibrations or tremors, and it is difficult to rapidly sight a target at a short distance or in an urgent situation.

That is, in such situations, complicated processes, such as capture and confirmation of a target, alignment of a line of sight, sighting, etc., and time are required. In addition, since the front sight and the rear sight are themselves very small, they are sensitive to even small vibrations when the front sight and the rear sight are accurately aligned. Moreover, when a user excessively concentrates on the alignment of the line of sight, the user s sight is focused on the front sight and the rear sight rather than the target or front circumstances. Thus, the user focuses too much attention on the alignment of the line of sight to the detriment of other duties such as firing or coping with urgent situations.

Accordingly, to cope with the difficulty in the alignment of the line of sight and raise the accuracy of sighting, a sighting device equipped with a telephoto lens has been proposed. However, an optical sighting device equipped with a telephoto lens is sensitive to even small vibrations when magnification increases due to the use of the telephoto lens. Thus, there is still a difficulty in rapid sighting.

To address these problems, a dot sighting device in which a no magnification or low magnification lens is used in an optical sighting device, and an aiming point only is simply used without a complicated line of sight has been proposed.

Optical dot sighting devices with no magnification (low magnification) can simply and rapidly sight a target, and are very useful in urgent situations or for short distances. In particular, time spent in alignment of the line of sight can be saved, sighting is itself performed such that a dot image is positioned to coincide with a target, and thus the user does not have to devote all of their attention to the alignment of the line of sight. Ultimately, rapid and accurate sighting are possible, and attention can be focused on other urgent situations.

However, conventional dot sighting devices are devices for monocular vision in which a user has to watch a sight mirror with only one eye. Thus, it takes a long time to sight a target, and visual problems also occur.

Figure 1:
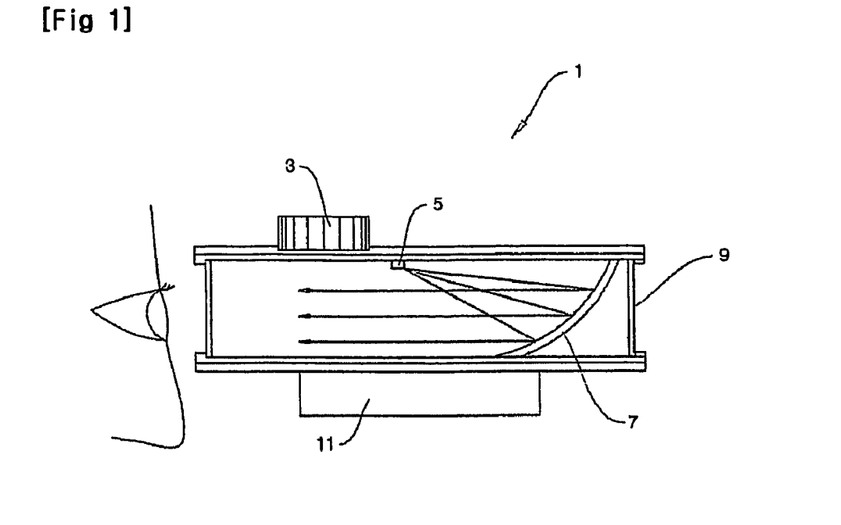
FIG. 1 is a schematic cross-sectional view of a conventional dot sighting device for monocular vision.

FIG. 1 is a schematic cross-sectional view of a conventional dot sighting device 1 for monocular vision. Referring to FIG. 1, in the conventional dot sighting device 1, the inside of the dot sighting device 1 is aligned using a rifle barrel alignment terminal 3 through a fixed grille 11, and then light emitted from a LED light source 5 is reflected from a reflection mirror 7, whereby an observer confirms an object with one eye. In general, a front surface (inside of the sighting device) of the reflection mirror 7 is coated in order to reflect the light emitted from the LED light source 5, and curved surfaces of the front surface and a rear surface of the reflection mirror 7 are spherical, and have the same curvature.

A dot image reflected from the reflection mirror 7 is sighted to coincide with a target object viewed through a protective window 9 at no magnification, whereby a user fires at the target object when the dot image reflected from the reflection mirror 7 coincides with the target object. Thus, the sighting can be easily performed.

More particularly, the light irradiated from the LED light source 5 disposed in the dot sighting device 1 is reflected from the reflection mirror 7, and incident on the eye of an observer in parallel. The direction in which the parallel light is reflected should coincide with a bullet firing axis of a gun barrel. If the parallel degree of the dot sighting device 1 does not coincide with the bullet firing axis of the gun barrel, a user cannot hit the target object even when a dot of the light irradiated from the LED light source 5 coincides with the target object. Thus, to coincide the parallel degree of the dot sighting device 1 with the bullet firing axis of the gun barrel, the rifle barrel alignment terminal 3 having vertical and horizontal adjustment functions is operated to coincide an optical axis of an inner barrel with the bullet firing axis of the gun barrel.

Figure 2:
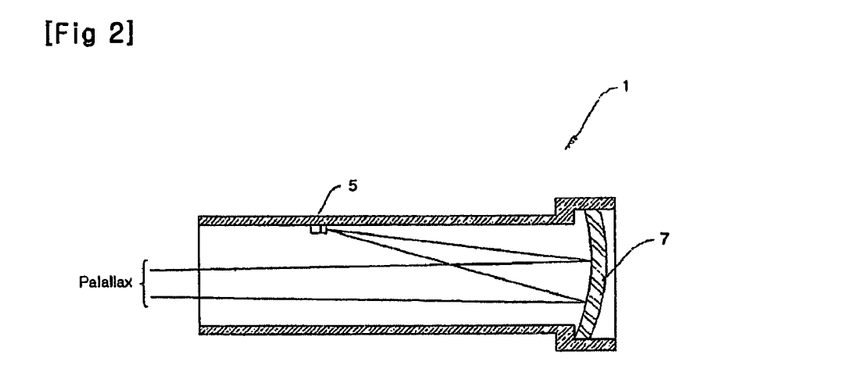
FIG. 2 is a schematic view illustrating the case in which parallax occurs in the conventional dot sighting device of FIG. 1.

FIG. 2 is a schematic view illustrating the case in which parallax occurs in the conventional dot sighting device of FIG. 1. However, as illustrated in FIG. 2, if the width of the reflection mirror 7 is not greater than a distance between pupils of a user, binocular vision obtained by overlapping of both eyes does not exist. In this state, when an external object is viewed through the reflection mirror 7, it is impossible to obtain information on the external object by binocular vision. Thus, the external object is viewed by an eye superior to the other eye, or double vision of the object occurs. In this case, eye strain is caused by not being able to accurately obtain information on the external object.

To address this problem, if only the size of a sight mirror, i.e., a protective mirror and the reflection mirror is simply increased, as illustrated in FIG. 2, parallax of the reflection mirror 7 itself occurs due to an increase of aberration of an ambient portion of the reflection mirror 7. Thus, the parallel degree of the dot sighting device does not coincide with the bullet firing axis of the gun barrel. The occurrence of parallax reduces the accuracy of sighting the target. FIG. 2 illustrates parallax in which light rays reflected from a general spherical reflection surface are not parallel to each other.

In addition, in conventional dot sighting devices, as illustrated in FIG. 1, regardless of the distance to the target, light irradiated from the LED light source 5 along the same optical axis is reflected from the reflection mirror 7, whereby a dot image is focused on the target. However, gravity continuously acts on a bullet after the bullet is fired until it hits the target, and thus the farther away the target, the greater a path of the bullet is changed. In conventional dot sighting devices, to reflect the change in the path of the bullet according to the distance, an optical axis of a main body of the dot sighting device and the parallel degree of the bullet firing axis of the gun barrel are mechanically adjusted. Thus, when the distance to the target material is suddenly changed, users cannot rapidly cope with the situation.

Moreover, the light irradiated from the LED light source uses a single reticle, and thus the same dot with respect to all targets is always formed. However, targets of a heavy machine gun, such as human, tanks, and aircraft each have different characteristics. For example, in the case of firing at aircraft, sighting and firing should be performed taking into consideration the velocity of the aircraft. Thus, in a conventional dot sighting device, it is difficult to perform accurate sighting and firing taking into account characteristics of targets.

DISCLOSURE OF INVENTION

Technical Problem

The present invention provides a dot sighting device with large caliber in which binocular vision is possible.

The present invention also provides a dot sighting device with large caliber that can prevent occurrence of parallax through a reflection mirror.

The present invention also provides a dot sighting device that can sight a target rapidly, taking into account a change of a bullet path according to a distance to the target.

The present invention also provides a dot sighting device that can rapidly sight a target by using a dot image that uses a reticle corresponding to characteristics of the target according to the target.

In addition, the technical goal of the present invention is not limited thereto, and the present invention can be embodied with a variety of goals by one of ordinary skill in the art to which the present invention pertains within the claims of the present invention.

Technical Solution

According to an aspect of the present invention, there is provided a dot sighting device comprising: a reflection mirror; an illumination having a LED irradiating light to the reflection mirror and a transparent reticle that is positioned in front of the LED and forms a dot image by transmitting the light irradiated from the LED; and a fixed grille formed on a lower portion of the dot sighting device, wherein the dot sighting device is attached to and detached from a mount for a heavy machine gun by the fixed grille, and a width X of the reflection mirror is greater than a distance Y between both eyes of a user.

The dot sighting device may further comprise a reticle selection unit connected to the illumination unit, wherein the transparent reticle is formed on a plane perpendicular to a reticle rotation axis that extends from the reticle selection unit and penetrates the illumination unit, thus being able to rotate based on the reticle rotation axis by rotation of the reticle selection unit, and a plurality of reticles according to a target are formed on the transparent reticle on the same radial axis around the reticle rotation axis, and one of the reticles corresponding to the target is selected by rotating the reticle selection unit according to the target.

The dot sighting device may further comprise a reticle selection unit connected to the illumination unit, wherein the transparent reticle is formed on a plane perpendicular to a reticle rotation axis that extends from the reticle selection unit and penetrates the illumination unit, thus being able to rotate based on the reticle rotation axis by rotation of the reticle selection unit, and a plurality of reticles are formed on the transparent reticle on the same radius axis around the reticle rotation axis, wherein the reticles are formed closer to the reticle rotation axis as a distance to the corresponding point of impact is farther, and one of the reticles is selected by rotating the reticle rotation unit according to a distance to the target.

The reticle rotation axis may comprise, around a reticle rotation connection axis, a rotation axis on an illumination unit side having a convex-concave portion with a plurality of convexes-concaves corresponding to a distance to a point of impact; and a rotation axis on a reticle selection unit side that has protrusions coupled to desired convexes-concaves of the convex-concave portion on an end thereof and the other end of which is connected to the transparent reticle, wherein the rotation axis on the illumination unit side and the rotation axis on the reticle selection unit side are separated from each other by pulling the reticle selection unit, and then the reticle selection unit is rotated so as to couple a desired convex-concave corresponding to the distance to the point of impact of the convex-concave portion of the rotation axis on the illumination unit side with the protrusion of the rotation axis on the reticle selection unit side.

The dot sighting device may comprise an upper plate and a lower plate, wherein the upper plate comprises a protective window; a reflection mirror; and an illumination unit, and wherein the lower plate comprises: a fixed grille formed on a lower portion of the dot sighting device; a bullet path adjustment handle installed at a side surface of the dot sighting device; an upper/lower click control bolt that connects the upper and lower plates and sets an origin point; a bullet path adjustment body that is accommodated in a bullet path adjustment body accommodation unit formed in the lower plate and is connected to the upper plate by fixing an end on the lower plate side of the upper/lower click control bolt to an upper portion of an upper/lower plate connection rotation axis penetrating a side surface of the lower plate; a bullet path adjustment axis that comprises a bullet path adjustment portion positioned on a bullet path adjustment axis contact portion at an end of the bullet path adjustment body, and penetrates the lower plate, thereby being connected to the bullet path adjustment handle; a connection pin of the bullet path adjustment body and the lower plate, penetrating the other end of the bullet path adjustment body and the lower plate from a side surface of the lower plate, thereby connecting the bullet path adjustment body and the lower plate; and a spring accommodation portion formed in a top surface of the lower plate on the bullet path adjustment axis contact portion side based on the connection pin, wherein the spring accommodation portion accommodates a spring, thereby pushing the upper plate and the lower plate apart from each other, wherein the bullet path adjustment body is rotatable around the upper/lower plate connection rotation axis, wherein the bullet path adjustment axis contacts a top surface of the bullet path adjustment axis contact portion of the bullet path adjustment body, and comprises a bullet path adjustment portion having a plurality of contact surfaces each having a different normal distance from the center of the bullet path adjustment axis, corresponding to a distance to a target, wherein, in the bullet path adjustment portion, by rotating the bullet path adjustment handle, a contact surface corresponding to a distance to a desired target contacts the bullet path adjustment axis contact portion.

The reflection mirror may comprise a doublet, each of a first surface and a third surface of the reflection mirror is spherical, and a second surface of the reflection mirror comprises a LED reflection surface, wherein a radius curvature of the first and third surfaces satisfies the following equation:

$$D_1 = \frac{n-1}{R_1}, D_2 = \frac{1-n}{R_3} \qquad (1)$$

$$D_1 + D_2 - \frac{d}{n} D_1 D_2 = 0$$

wherein $D_1$ denotes a refractive power of the first surface, $D_2$ denotes a refractive power of the third surface, d denotes a distance between the centers of the first and third surfaces, $R_1$ denotes a radius curvature of the first surface, $R_3$ denotes a radius curvature of the third surface, and n denotes a refractive index of the material.

The second surface may comprise an aspheric surface having a conic coefficient.

Advantageous Effects

According to the present invention, a dot sighting device with large caliber for a heavy machine gun in which binocular vision is possible can be obtained.

In addition, according to the present invention, a target can be rapidly sighted taking into consideration distance amendment, and thus firing can be performed taking into consideration differences according to a distance of the target.

While the present invention has been particularly shown and described with reference to exemplary embodiments thereof, it will be understood by those of ordinary skill in the art that various changes in form and details may be made therein without departing from the spirit and scope of the present invention as defined by the following claims.

BRIEF DESCRIPTION OF THE DRAWINGS

The above and other features and advantages of the present invention will become more apparent by describing in detail exemplary embodiments thereof with reference to the attached drawings in which.

BEST MODE FOR CARRYING OUT THE INVENTION

The present invention will now be described more specifically with reference to the accompanying drawings, in which exemplary embodiments of the invention are shown.

Figure 3:
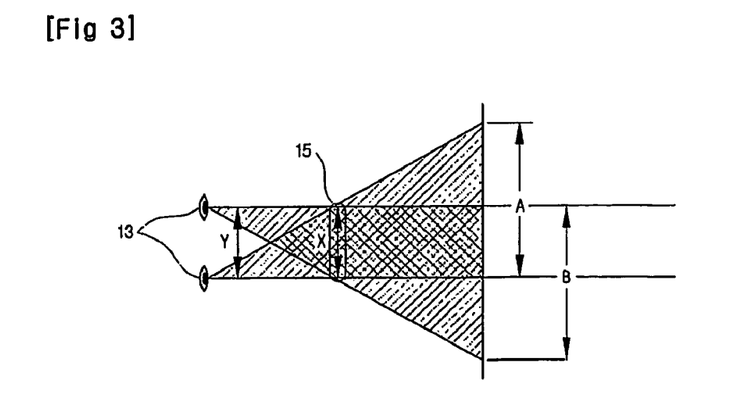
FIG. 3 schematically illustrates a visual problem occurring when a conventional dot sighting device for monocular vision is observed with both eyes.

FIG. 3 illustrates a visual problem occurring when a reflection mirror 15 of a conventional dot sighting device is observed with both eyes 13. Referring to FIG. 3, when a width X of the reflection mirror 15 is the same as or less than a distance Y between both eyes 13, diplopia as described above occurs, thereby causing eye strain, and external information acquired by both eyes 13 is distorted.

Figure 4:
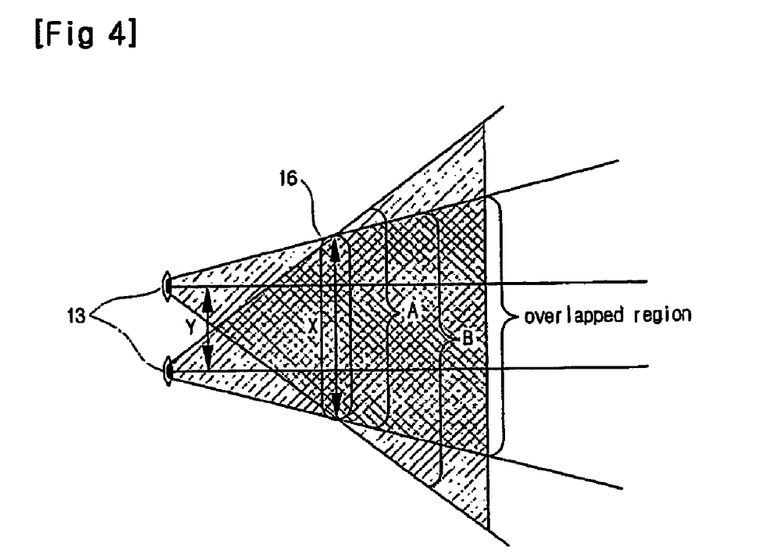
FIG. 4 is a schematic view showing a case when a dot sighting device with large caliber for binocular vision, according to an embodiment of the present invention, is observed with both eyes.

FIG. 4 is a schematic view showing a case when a dot sighting device with large caliber for binocular vision, according to an embodiment of the present invention, is observed with both eyes 13. Referring to FIG. 4, a width X of a reflection mirror 16 is greater than a distance Y between both eyes 13. Thus, a right eye view 'A' nearly coincides with a left eye view 'B' and external information is acquired in an overlapped region of the right eye view 'A' and the left eye view 'B'. That is, since information on external objects is acquired by simultaneously using both eyes 13, stereoscopic vision, which is an advantage of binocular vision with respect to monocular vision, is possible, and a sense of distance can be maintained.

Hereinafter, various embodiments of the dot sighting device with large caliber, according to the present invention, will be described with reference to the accompanying drawings. However, these embodiments are for illustrative purposes only and are not intended to limit the scope of the present invention. In addition, simple replacements, such as design modifications obvious in the art to which the present invention pertains are not intended to limit the scope of the present invention.

Embodiment 1

Figure 5:
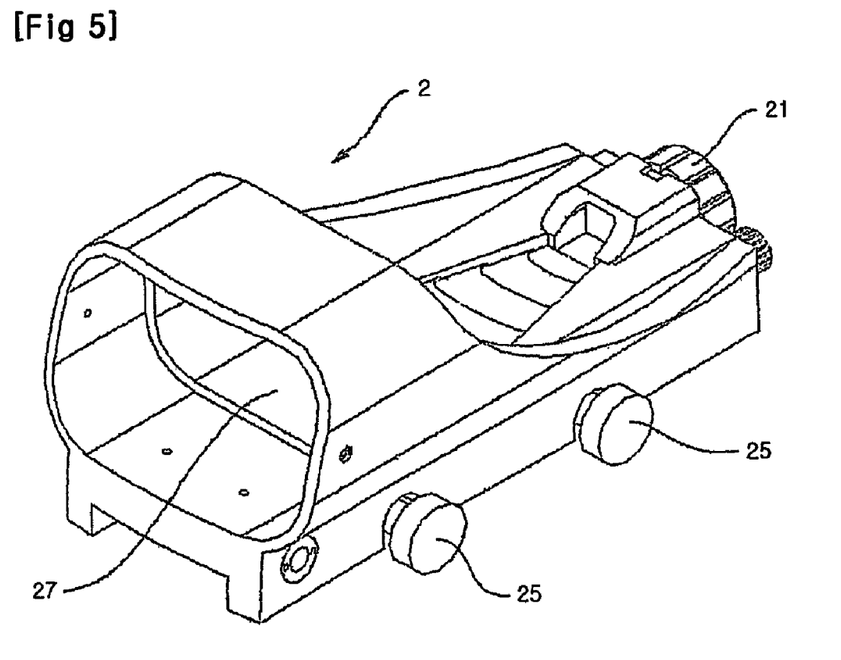
FIGS. 5 and 6 are schematic views illustrating a dot sighting device equipped with a reticle selection unit, according to an embodiment of the present invention.
Figure 6:
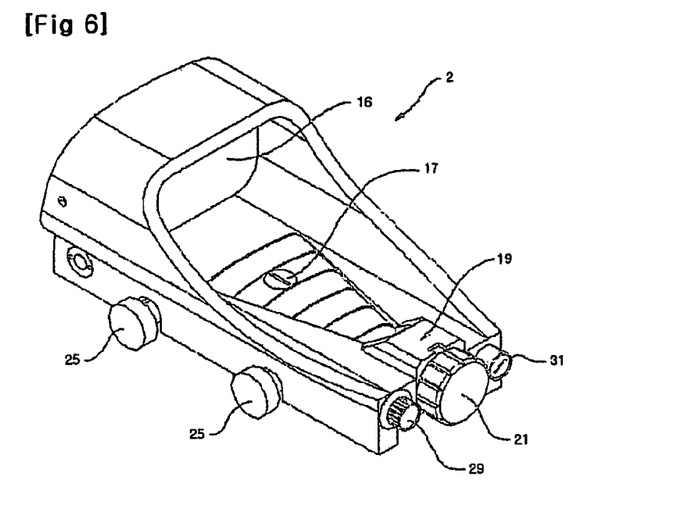

FIGS. 5 and 6 are schematic views illustrating a dot sighting device 2 equipped with a reticle selection unit, according to an embodiment of the present invention.

In the dot sighting device 2, a fixed grille 23 (refer to FIG. 13) is fixed to a mount for a heavy machine gun (not shown) with fixing bolts 25, and a upper/lower click control bolt 17 and a left/right click control bolt 45 (refer to FIG. 13) are used to adjust an origin point. A user confirms an external target through a protective window 27 and a reflection mirror 16. Light irradiated from an LED light source in an illumination unit 19 forms a dot image on the reflection mirror 16 and is reflected, and the reflected light is incident on eyes of a user, thereby allowing the user to view the dot image. The brightness of the LED light source can be adjusted by a control switch 31. In addition, the LED light source can be driven by a built-in battery in a battery case 29, or driven with electrical power supplied from an external electrical source. Alternatively, the built-in battery can be charged using an external electrical source.

Figure 7:
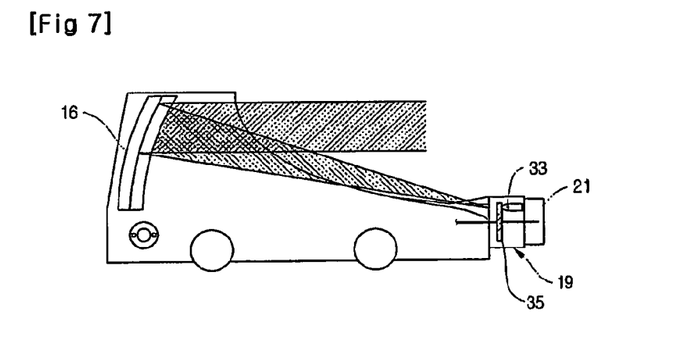
FIG. 7 is a schematic cross-sectional view for explaining an operating principle of a dot sighting device according to an embodiment of the present invention.

FIG. 7 is a schematic view for explaining an operating principle of an illumination unit 19 and a reflection mirror 16 of a dot sighting device according to an embodiment of the present invention.

Referring to FIG. 7, an illumination device 33 using an LED or the like is installed in the illumination unit 19, and acts as a light source. Light irradiated from the illumination device 33 is transmitted through a transparent reticle of a revolving transparent reticle 35 disposed in front of the illumination device 33 and is irradiated to the reflection mirror 16. The light irradiated to the reflection mirror 16 is reflected and incident on eyes of a user, and the user views a transparent reticle-shaped dot.

Figure 8:
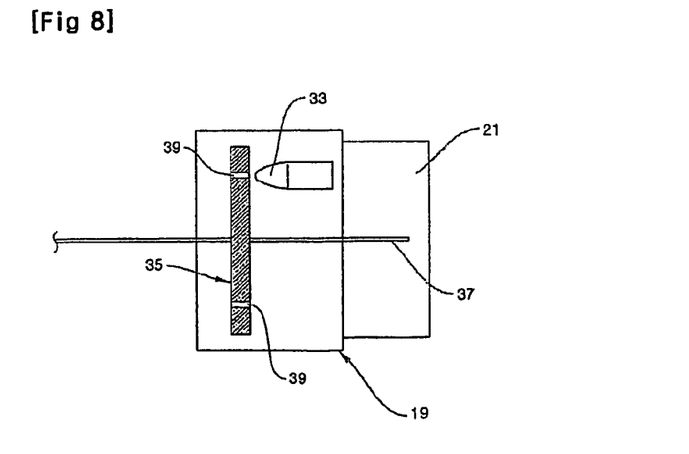
FIG. 8 is a schematic cross-sectional view of an illumination unit according to an embodiment of the present invention.

FIG. 8 is a view illustrating in detail an operating principle of a reticle selection unit 21 and the illumination unit 19 of the dot sighting device of FIG. 7, according to an embodiment of the present invention. The revolving transparent reticle 35 is formed on a plane perpendicular to a reticle rotation axis 37 that extends from the reticle selection unit 21 disposed adjacent to the illumination unit 19 and penetrates the illumination unit 19. In addition, when the reticle rotation axis 37 rotates by rotation of the reticle selection unit 21, the revolving transparent reticle 35 accordingly rotates. Thus, users can select a desired reticle from among various types of reticles formed in the revolving transparent reticle 35 by rotating the reticle selection unit 21.

Example 1

Figure 9:
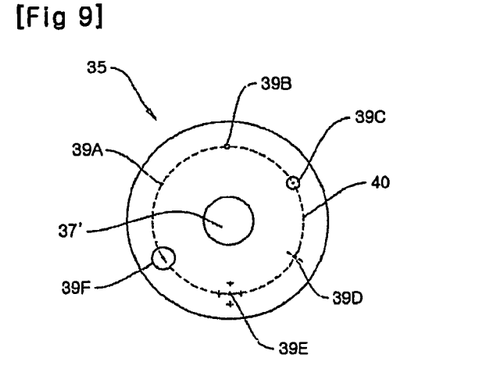
FIG. 9 is a schematic view of a revolving transparent reticle according to an embodiment of the present invention.

FIG. 9 is a view of the revolving transparent reticle 35 of the dot sighting device of FIG. 7, according to an embodiment of the present invention. A variety of reticles 39A through 39F are formed in the revolving transparent reticle 35 along a reticle rotation line 40 having a radial axis based on a center axis 37' of the revolving transparent reticle 35. For example, to sight and fire at a moving vehicle, helicopter, fighter plane, or the like, the sighting should be performed by taking into consideration velocity or the like of the moving target, unlike firing at human. Thus, a dot image should be formed by taking such factors into account. Dot images for objects are, in general, largely categorized into dot images for short distances, dot images for long distances, and dot images for anti-aircraft firing. In addition, different dot images are used for humans and horses, for tanks, for helicopters, for fighter planes, and the like. In the revolving transparent reticle 35 according to the current embodiment of the present invention, taking into consideration the characteristics of the target, a long distance reticle for humans and horses 39A, a short distance reticle for humans and horses 39B, a reticle for still vehicles and tanks 39C, a reticle for moving vehicles and tanks 39D, a reticle for anti-aircraft helicopters 39E, and a reticle for anti-aircraft fighter planes 39F are radially formed along the reticle rotation line 40.

The reticle rotation axis 37 penetrates the center axis 37' of the revolving transparent reticle 35, and the revolving transparent reticle 35 is fixed to the reticle rotation axis 37 and rotates according to the rotation of the reticle rotation axis 37. Thus, users can rapidly select a reticle for forming a dot image appropriate for a target by rotating the reticle selection unit 21. As a result, sighting and firing can be rapidly and accurately performed.

Example 2

Figure 10:
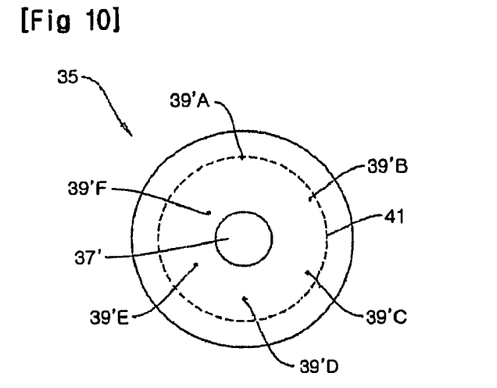
FIG. 10 is a view of a revolving transparent reticle according to another embodiment of the present invention.

FIG. 10 is a view of the revolving transparent reticle 35 of the dot sighting device of FIG. 7, according to another embodiment of the present invention. A fired bullet is continuously affected by gravity until the bullet reaches a target. Thus, if a distance to the target material is farther, the bullet reaches a position that is different from an originally sighted position. Therefore, to increase accuracy, the distance to the target should be amended while sighting the target, taking into consideration the distance.

When gravity is taken into consideration, the farther the distance to the target, the greater an angle formed between a gun barrel and a horizontal plane should be. Thus, in the revolving transparent reticle 35 of FIG. 10, taking the above into consideration, the farther the distance to the target based on a sighting baseline 41, the closer reticles 39'A through 39'F are formed to the center axis 37'.

For example, if the sighting baseline 41 is a baseline with respect to a target 100 m away, the reticle 39'A with respect to the target 100 m away from a shooter is formed on the sighting baseline 41. In addition, the reticle 39'B with respect to a target 200 m away from the shooter is formed towards the center axis 37' as much as pre-set distance from the sighting baseline 41. In addition, the reticle 39'C with respect to a target 400 m away, the reticle 39'D with respect to a target 800 m away, the reticle 39E with respect to a target 1200 m away, and the reticle 39'F with respect to a target 1600 m away are formed towards the center axis 37' as much as pre-set distances.

The reticle rotation axis 37 penetrates the center axis 37' of the revolving transparent reticle 35, and the revolving transparent reticle 35 is fixed to the reticle rotation axis 37 and rotates according to the rotation of the reticle rotation axis 37. Thus, users can rapidly select a reticle for forming a dot image appropriate for a target by rotating the reticle selection unit 21, taking into consideration a distance to the target. As a result, sighting and firing can be rapidly and accurately performed.

In Examples 1 and 2, the center axis 37' of the revolving transparent reticle 35 is formed at the center of the revolving transparent reticle 35. However, the center axis 37' can be formed at a position deviated from the center of the revolving transparent reticle 35 in the two examples described above. That is, taking into account the distance to the target, the center axis 37' can be formed at a position that is close to a reticle to be used for a long distance target in advance.

MODE FOR THE INVENTION

Embodiment 2

To maintain stereoscopic vision, i.e., a sense of distance by making the width of a reflection mirror greater than a distance between both eyes of a user, a virtual image of a dot should be formed within binocular fixation distance. As a result, a target and a dot sighted at the target can be accurately viewed without eye strain.

To form a dot at a binocular fixation point during binocular fixation, i.e., to position an image of a reticle by the reflection mirror at the binocular fixation point, a change of position should be performed by moving an illumination unit, particularly, a reticle acting as a point light source, forward or backward.

For example, in three cases of a 100 m reticle, a 200 m reticle, and a 400 m reticle, an operation in which a position of the point light source of the illumination unit is finely moved to a direction of a focal point of the reflection mirror is needed.

A distance of stereoscopic vision in which human eyes can have a three-dimensional effect is about 240 m according to Hermann von Helmholtz. Thus, 800 m, 1200 m and 1600 m reticles may be positioned at the focal point of the reflection mirror in order to position a dot image after reflection from the reflection mirror at infinity in front of the eyes, as in the case of the 400 m reticle.

When the focal point of the reflection mirror is f mm, a shift s of a z m reticle from the focal point of the reflection mirror to the reflection mirror can be calculated using Equation 2 below, and examples of the calculation are shown in the following table.

$$S = f - \frac{1000zf}{1000z - f} \quad (2)$$

TABLE 1

| Reticle type | 50 m reticle | 100 m reticle | 200 m reticle | 400 m reticle |
|---|---|---|---|---|
| Calculation example of a shift of a reticle in a reflection mirror having an actual focal distance of 229 mm | 1.05 mm | 0.53 mm | 0.26 mm | 0.13 mm |

Figure 11:
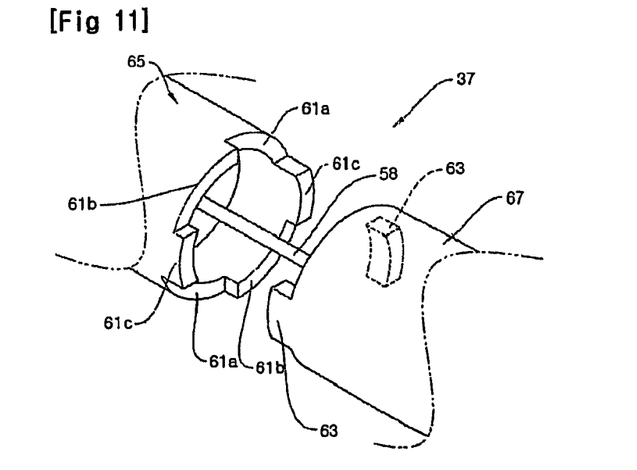
FIG. 11 is a schematic view of a reticle rotation axis according to an embodiment of the present invention.

\* The above table shows calculation of shifts of 4 types of reticles from the focal point of the reflection mirror to the reflection mirror in the reflection mirror having an actual focal distance of 229 mm To move the reticle taking into account the shift, a reticle rotation axis 37 as illustrated in FIG. 11 can be taken into consideration. FIG. 11 is a schematic view of the reticle rotation axis 37 illustrated in FIG. 8, according to an embodiment of the present invention.

Referring to FIG. 11, the reticle rotation axis 37 includes a rotation axis 65 on an illumination unit side, which extends from a front surface of the illumination unit 19, a rotation axis 67 on a reticle selection unit side, and a connection axis 58 of the reticle rotation axis 37. A revolving transparent reticle is attached to a rear portion of the rotation axis 67 on the reticle selection unit side. Referring to FIG. 11, convexes-concaves 61a through 61c are formed on an end of the rotation axis 65 on the illumination unit side along the circumference thereof. The size of each of the convexes-concaves 61a through 61c corresponds to a shift distance according to each of the reticles shown in the table above. Protrusions 63 are formed on an end of the rotation axis 67 on the reticle selection unit side coupled to the rotation axis 65 on the illumination unit side.

When a user pulls the reticle selection unit 21, the rotation axis 65 on the illumination unit side and the rotation axis 67 on the reticle selection unit side are separated from each other, and the protrusions 63 rotate as the rotation axis 67 on the reticle selection unit side rotates by rotating the reticle selection unit 21. When the protrusions 63 are positioned to correspond to the convexes-concaves 61, which corresponds to a desired shift distance of the reticle, the protrusions 63 and the convexes-concaves 61 are coupled if the reticle selection unit 21 is released.

Thus, a user can rapidly amend a dot image corresponding to a distance during stereoscopic vision. As a result, sighting and firing can be rapidly and accurately performed.

Embodiment 3

Figure 12:
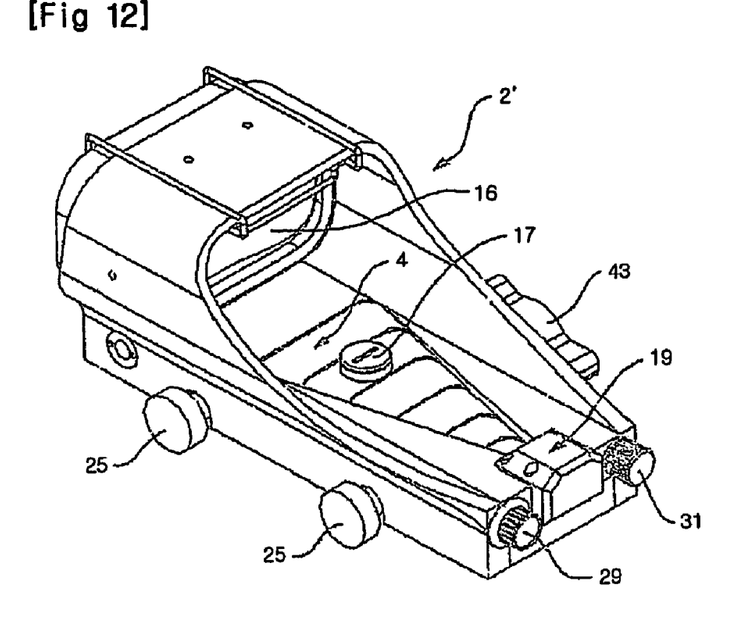
FIGS. 12 and 13 are schematic views of a dot sighting device with large caliber according to another embodiment of the present invention, in which an optical axis adjustment device is included.
Figure 13:
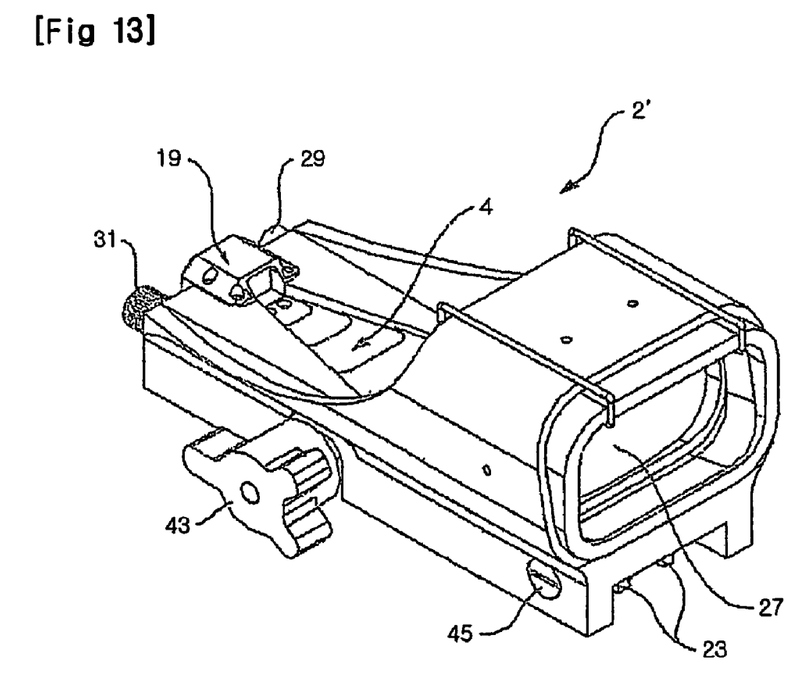

FIGS. 12 and 13 are views of dot sighting devices according to other embodiments of the present invention, in which a path of a bullet can be adjusted.

In the present embodiments, the path of the bullet is adjusted by rotating a bullet path adjustment handle 43 instead of using the reticle selection unit. The dot sighting devices according to the current embodiments of the present invention in which the path of the bullet can be adjusted will now be described with reference to the following drawings.

Figure 14:
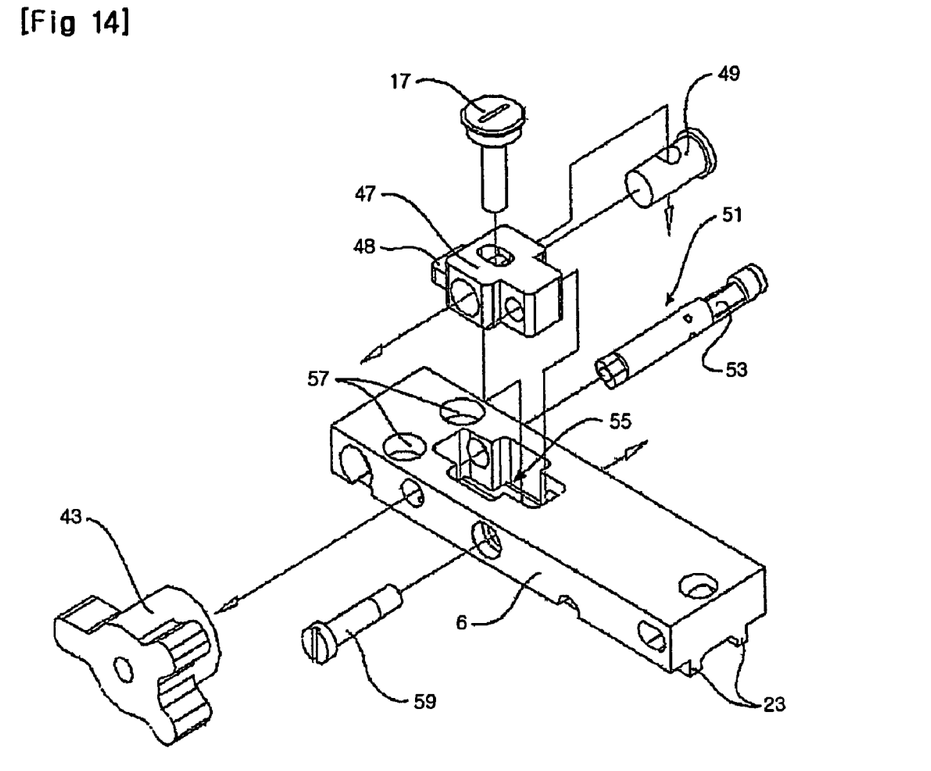
FIG. 14 is a schematic assembly view of an optical axis adjustment device according to an embodiment of the present invention.

FIG. 14 is a schematic assembly view of an optical axis adjustment device according to an embodiment of the present invention.

A lower plate 6 illustrated in FIG. 14 is disposed below an upper plate 4 of FIGS. 12 and 13.

Referring to FIG. 14, a groove in which an upper/lower click control bolt 17 is accommodated is formed in a top surface portion of a bullet path adjustment body 47, and an upper/lower plate connection rotation axis 49 is inserted through a side surface center portion of the bullet path adjustment body 47. The upper/lower click control bolt 17 accommodated from the top surface portion of the bullet path adjustment body 47 is fixedly inserted in a center portion groove of the upper/lower plate connection rotation axis 49. The bullet path adjustment body 47 connected to the upper/lower click control bolt 17 by the upper/lower plate connection rotation axis 49 is accommodated in a bullet path adjustment body accommodation unit 55 formed in the lower plate 6. In addition, the bullet path adjustment body 47 is coupled to the lower plate 6 by a connection pin 59 that penetrates a side surface of the lower plate 6 and couples the bullet path adjustment body 47 with the lower plate 6.

Thus, the upper/lower click control bolt 17 can rotate around the upper/lower plate connection rotation axis 49, and the bullet path adjustment body 47 can rotate around the connection pin 59.

In addition, the bullet path adjustment body 47 is connected to the upper plate 4 through the upper/lower click control bolt 17 fixed to the upper plate 4, and is connected to the lower plate 6 by the connection pin 59.

A bullet path adjustment axis 51 passes through the lower plate 6, passes by and contacts a bullet path adjustment axis contact portion 48 of the bullet path adjustment body 47, and is connected to the bullet path adjustment handle 43. A bullet path adjustment portion 53 of the bullet path adjustment axis 51 contacts the bullet path adjustment axis contact portion 48 of the bullet path adjustment body 47, facing each other.

Spring accommodation portions 57 are formed in a top surface of the lower plate 6, at a position adjacent to the bullet path adjustment body accommodation unit 55 and parallel to the connection pin 59, as illustrated in FIG. 14. In addition, springs are accommodated in the spring accommodation portions 57, whereby a repulsive force acts on the upper and lower plates 4 and 6.

A configuration for adjusting the bullet path of the dot sighting device according to the present embodiment will now be described with reference to FIGS. 15 and 16.

Figure 15:
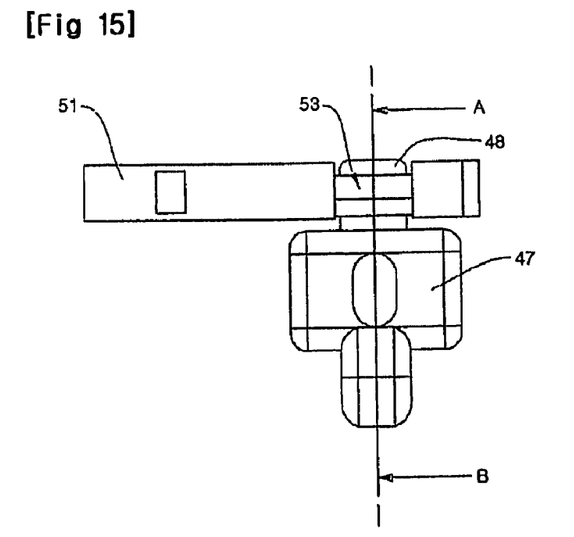
FIGS. 15 and 16 are schematic views for explaining an operating principle of a bullet path adjustment body and a bullet path adjustment axis of the optical axis adjustment device of FIG. 14, according to an embodiment of the present invention.
Figure 16:
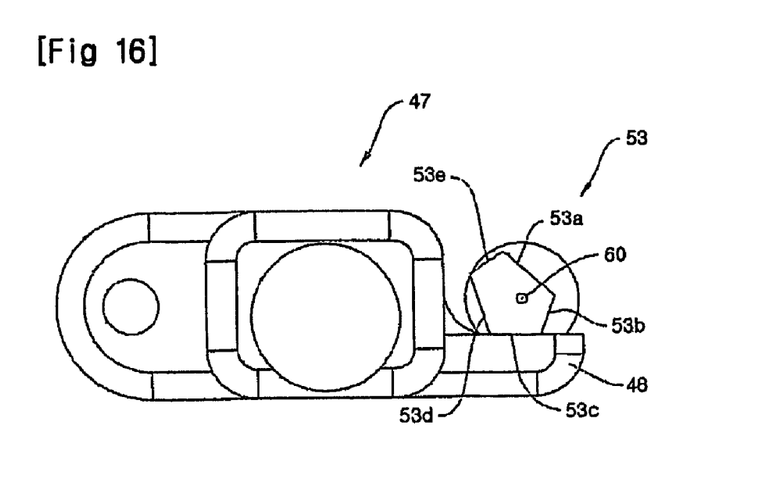

FIGS. 15 and 16 are schematic views for explaining an operating principle of a bullet path adjustment body and a bullet path adjustment axis of the optical axis adjustment device of FIG. 14, according to an embodiment of the present invention.

Referring to FIG. 15, the bullet path adjustment portion 53 of the bullet path adjustment axis 51 passes by and contacts the bullet path adjustment axis contact portion 48 of the bullet path adjustment body 47. FIG. 16 is a cross-sectional view taken along a line A-B of FIG. 15. Referring to FIG. 16, the bullet path adjustment portion 53 comprises a plurality of contact surfaces 53a through 53e each having a different normal distance from center of rotation 60 of the bullet path adjustment axis 51.

The springs of the spring accommodation portions 57 push the upper and lower plates 4 and 6 away from each other, and thus a force, directed towards the upper plate 4 from the lower plate 6 acts on the bullet path adjustment body 47 connected to the upper plate 4 by the upper/lower click control bolt 17. That is, a force that rotates towards the upper plate 4 based on the connection pin 59 continuously acts on the bullet path adjustment body 47 connected to the upper plate 4. Thus, when the contact surface contacting the bullet path adjustment axis contact portion 48 in the bullet path adjustment portion 53 is changed, a distance between the upper plate 4 and the lower plate 6 is changed.

For example, when the bullet path adjustment axis contact portion 48 of the bullet path adjustment body 47 contacts the contact surface 53d having a relatively long normal distance from the center of rotation 60, and then contacts the contact surface 53a having a relatively short normal distance from the center of rotation 60, the distance between the upper plate 4 and the lower plate 6 becomes closer. In the opposite case, the distance between the upper plate 4 and the lower plate 6 becomes farther.

Since the lower plate 6 is fixed to the mount for a heavy machine gun, the distance between the upper plate 4 and the lower plate 6 is changed by a fine change in a slope of the upper plate 4 with respect to the fixed lower plate 6. By calculating an amendment angle according to a distance in advance, each of the contact surfaces 53a through 53e of the bullet path adjustment portion 53 is formed at a normal distance corresponding to the amendment angle. Thus, when a corresponding contact surface is selected by rotating the bullet path adjustment handle 43, the slope of the upper plate 4 is changed according to the distance to the target. Then, when the target is sighted through the reflection mirror of the upper plate 4 having the changed slope and the protective window, the same amendment effect according to a distance as in Example 2 of Embodiment 1 can be obtained.

Embodiment 4

As described above, in the dot sighting device having large caliber and using the reflection mirror, according to the present invention, there is a need to address the problem of parallax according to aberration.

Figure 17:
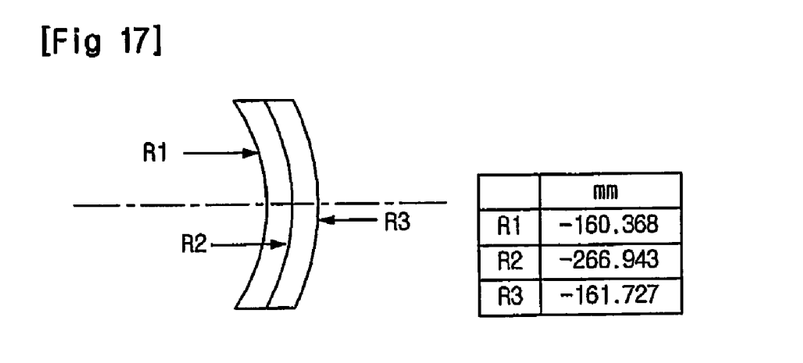
FIG. 17 is a schematic view illustrating a structure of a reflection mirror according to an embodiment of the present invention.

FIG. 17 is a schematic view illustrating a structure of a reflection mirror according to an embodiment of the present invention. In the present embodiment, a distance between a LED and a reflection surface is set at 200 mm, and a thickness of the center of the reflection mirror is set at 4.0 mm.

A LED dot is reflected from a $R_2$ surface and emitted to the outside. In this regard, when incident on the reflection mirror, the LED dot is transmitted through a $R_1$ surface, is reflected from the $R_2$ surface, and then is transmitted through the $R_1$ surface again, and consequently, the LED dot is incident on the eyes of an observer. That is, since the LED dot is transmitted through the $R_1$ surface twice and is transmitted through the $R_2$ surface once, a further degree of freedom in design is provided. Due to this, parallax can be minimized. To decrease magnification occurrence when an external target point is focused on the eyes of the observer, the reflection mirror can be configured to become an afocal system. The configuration applies to radius curvature of first and third surfaces by using Equation 1 below.

When d denotes a distance between centers (center thickness) of first and third surfaces of a doublet, $R_1$ denotes radius curvature of the first surface, $R_3$ denotes radius curvature of the third surface, and n denotes a refractive index of the material, the following equation is obtained.

$$D_1 = \frac{n-1}{R_1}, D_2 = \frac{1-n}{R_3} \qquad (1)$$

$$D_1 + D_2 - \frac{d}{n}D_1D_2 = 0,$$

wherein $D_1$ denotes a refractive power of the first surface and $D_2$ denotes a refractive power of the third surface. By using the reflection mirror according the present embodiment, it was confirmed that parallax was reduced by 80% or greater.

Figure 18:
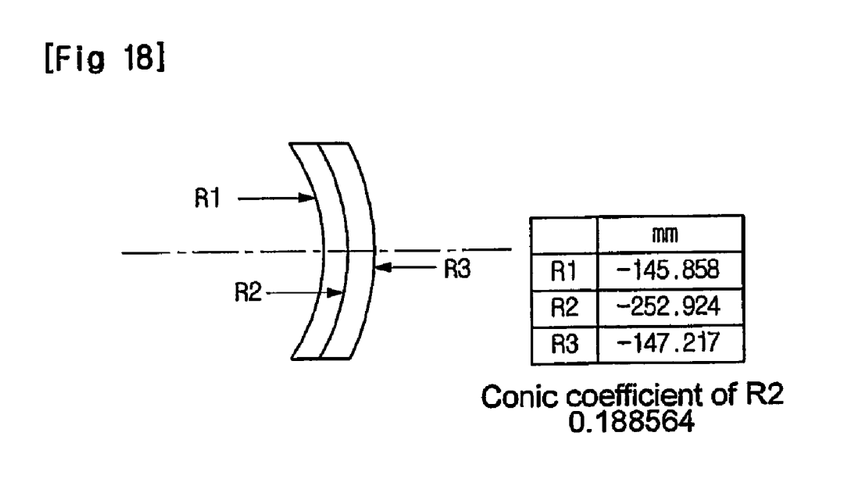
FIG. 18 is a schematic view illustrating a structure of a reflection mirror according to another embodiment of the present invention.

FIG. 18 is a schematic view illustrating a structure of a reflection mirror, according to another embodiment of the present invention. Referring to FIG. 18, when a second surface is an aspheric surface having a conic coefficient, the parallax is further minimized. In this case, parallax was reduced by 90% or greater, compared to that of the reflection mirror of FIG. 17.

Figure 19:
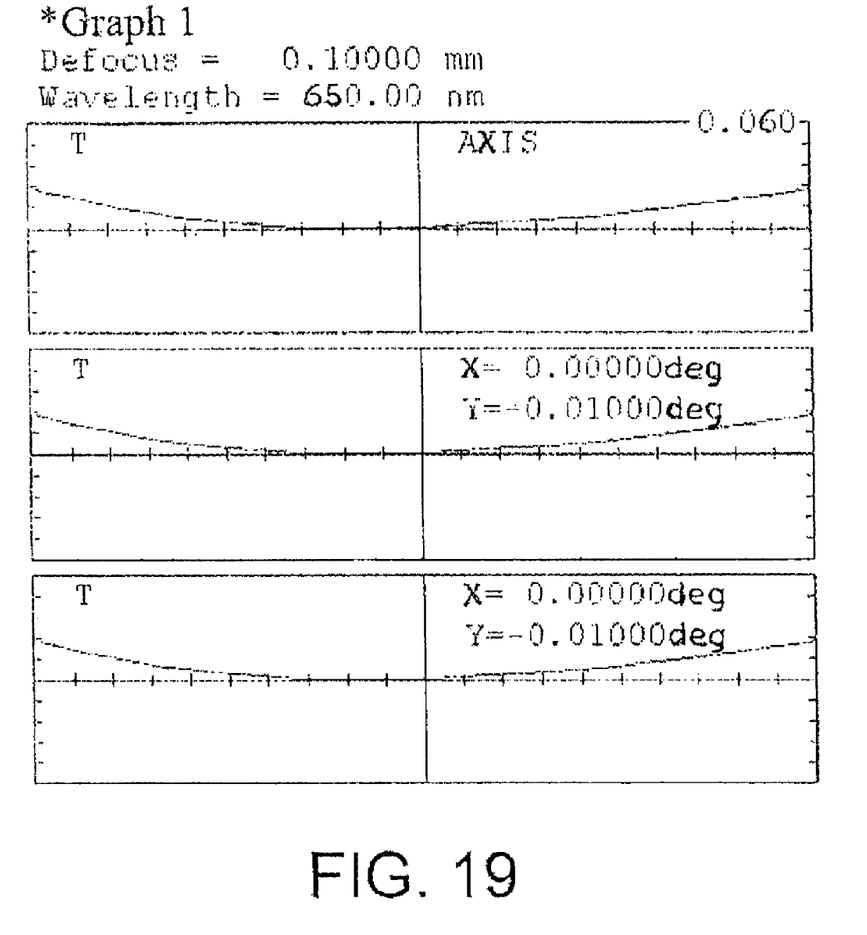
FIG. 19 illustrates a graph showing Tangential ray aberration degrees in a specific case.
Figure 20:
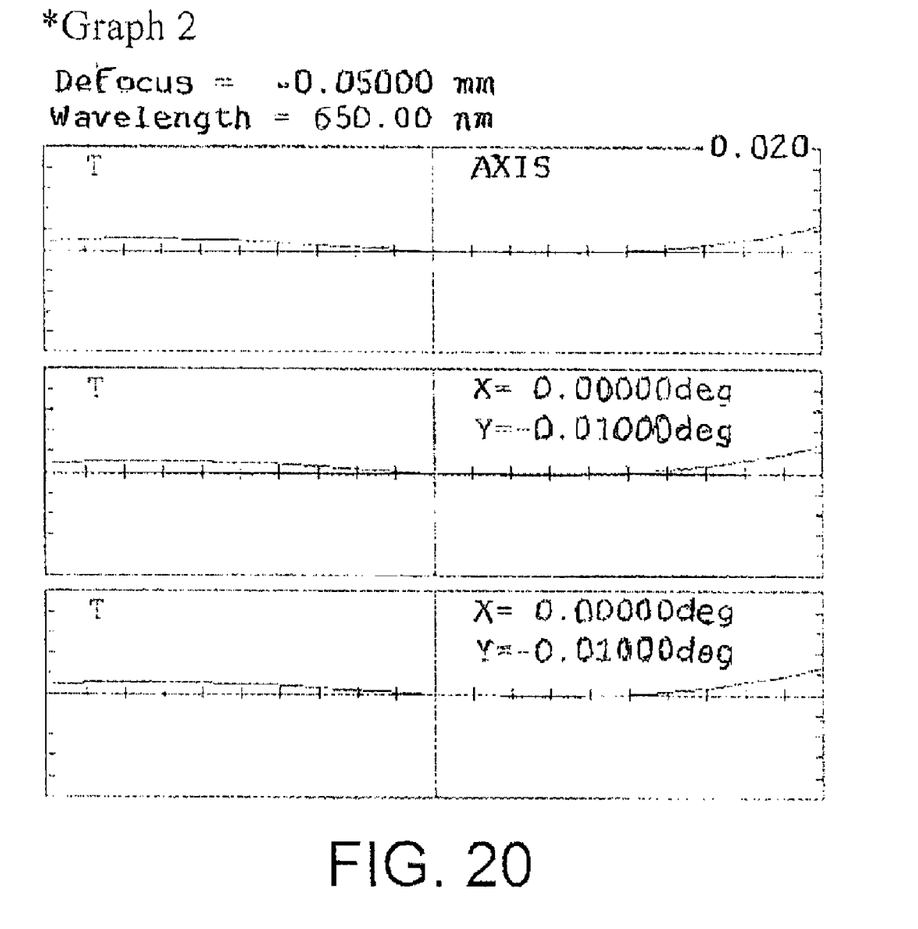
FIG. 20 illustrates another graph showing Tangential ray aberration degrees in another specific case.
Figure 21:
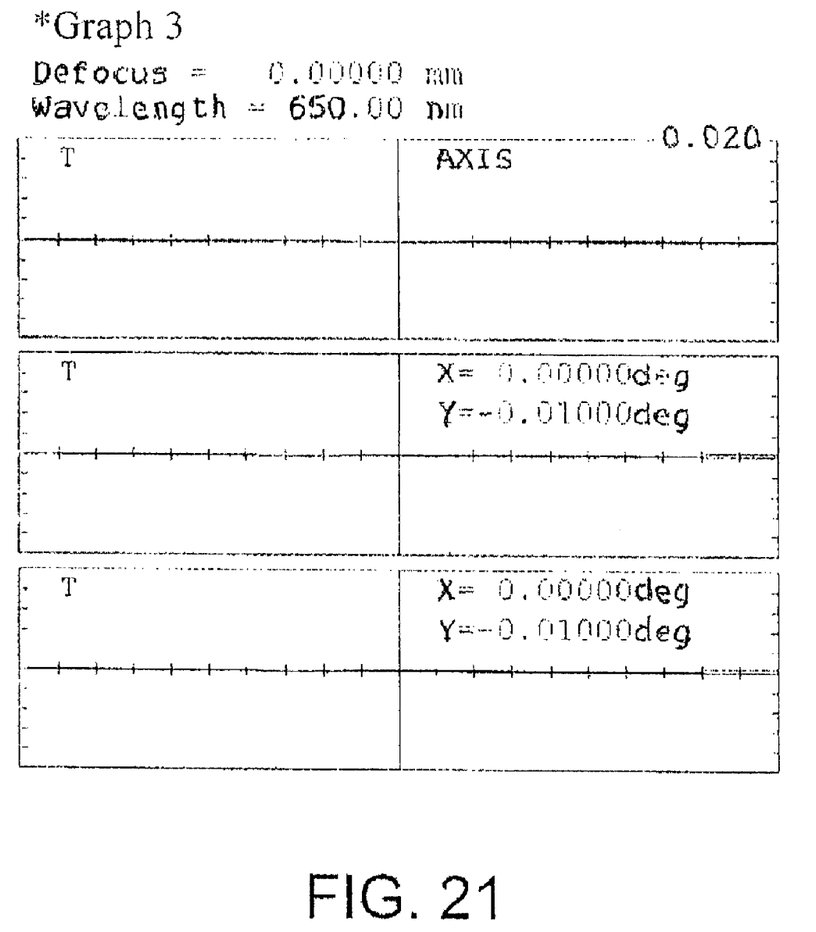
FIG. 21 illustrates yet a further graph showing Tangential ray aberration degrees in yet a further specific case.

The following three graphs FIGS. 19, 20 and 21 respectively show Tangential ray aberration degrees in the case of a conventional single reflection surface, in the case of a doublet reflection surface (when the reflection surface between two lenses is spherical), and in the case of a doublet reflection surface where a conic aspheric surface is adopted as the reflection surface between two lenses. Each lens has an inclination angle of −2.0°.

FIG. 19 is a graph representing spherical aberration, and when it coincides with an X axis, parallax does not occur. A maximum aberration value of the conventional single reflection surface is 0.02 mm, a maximum aberration value when the spherical reflection surface is adopted as a median surface of the doublet is 0.004 mm, and a maximum aberration value when the conic aspheric reflection surface is adopted as a median surface of the doublet is 0.0004 mm. Thus, when a space accounting for 50% of a total region from the center is regarded as an effective space, the spherical reflection surface employed as the median surface of the doublet has an improvement in terms of the integral value of spherical aberration amount (y axis) with respect to x axis (an effective space that LED light beam reflects by a minimum of 80% or greater, compared with the conventional single reflection surface. In addition, the conic aspheric reflection surface employed as the median surface of the doublet has an improvement in terms of the integral value of by a minimum of 90% or greater, compared with the spherical reflection surface employed as the median surface of the doublet.

INDUSTRIAL APPLICABILITY

According to the present invention, a dot sighting device with large caliber for a heavy machine gun in which binocular vision is possible can be obtained.

In addition, according to the present invention, a target can be rapidly sighted taking into consideration distance amendment, and thus firing can be performed taking into consideration differences according to a distance of the target.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A dot sighting device comprising:
a reflection mirror;
an illumination having a LED irradiating light to the reflection mirror and a transparent reticle that is positioned in front of the LED and forms a dot image by transmitting the light irradiated from the LED;
a fixed grille formed on a lower portion of the dot sighting device;
wherein the dot sighting device is attached to and detached from a mount for a heavy machine gun by the fixed grille;
wherein the reflection mirror comprises a doublet, with a first surface, an interior second surface and a third surface, with the first surface and third surface being spherical, wherein the interior second surface of the reflection mirror comprises a LED reflection surface;
wherein a radius curvature of the first and third surfaces satisfies the following equation:

$$D_1 = \frac{n-1}{R_1}, D_2 = \frac{1-n}{R_3} \quad (1)$$

$$D_1 + D_2 - \frac{d}{n}D_1D_2 = 0$$

wherein $D_1$ denotes a refractive power of the first surface $D_2$ denotes a refractive power of the third surface, d denotes a distance between the centers of the first and third surfaces, $R_1$ denotes a radius curvature of the first surface, $R_3$ denotes a radius curvature of the third surface, and n denotes a refractive index of the material.

2. The dot sighting device of claim 1, further comprising a reticle selection unit connected to the illumination unit, wherein the transparent reticle is formed on a plane perpendicular to a reticle rotation axis that extends from the reticle selection unit and penetrates the illumination unit, thus being able to rotate based on the reticle rotation axis by rotation of the reticle selection unit, and a plurality of reticles according to a target are formed on the transparent reticle on the same radial axis around the reticle rotation axis, and one of the reticles corresponding to the target is selected by rotating the reticle selection unit according to the target.

3. The dot sighting device of claim 1, further comprising a reticle selection unit connected to the illumination unit, wherein the transparent reticle is formed on a plane perpendicular to a reticle rotation axis that extends from the reticle selection unit and penetrates the illumination unit, thus being able to rotate based on the reticle rotation axis by rotation of the reticle selection unit, and a plurality of reticles are formed on the transparent reticle on the same radius axis around the reticle rotation axis, wherein the reticles are formed closer to the reticle rotation axis as a distance to the corresponding point of impact is farther, and one of the reticles is selected by rotating the reticle rotation unit according to a distance to the target.

4. A dot sighting device comprising:
a reflection mirror;
an illumination having a LED irradiating light to the reflection mirror and a transparent reticle that is positioned in front of the LED and forms a dot image by transmitting the light irradiated from the LED;
a fixed grille formed on a lower portion of the dot sighting device;
wherein the dot sighting device is attached to and detached from a mount for a heavy machine gun by the fixed grille;
the dot sighting device further comprising a reticle selection unit connected to the illumination unit, wherein the transparent reticle is formed on a plane perpendicular to a reticle rotation axis that extends from the reticle selection unit and penetrates the illumination unit, thus being able to rotate based on the reticle rotation axis by rotation of the reticle selection unit, and a plurality of reticles according to a target are formed on the transparent reticle on the same radial axis around the reticle rotation axis, and one of the reticles corresponding to the target is selected by rotating the reticle selection unit according to the target;
wherein the reticle rotation axis comprises, around a reticle rotation connection axis, a rotation axis on an illumination unit side having a convex-concave portion with a plurality of convexes-concaves corresponding to a distance to a point of impact; and a rotation axis on a reticle selection unit side that has protrusions coupled to desired convexes-concaves of the convex-concave portion on an end thereof and the other end of which is connected to the transparent reticle,
wherein the rotation axis on the illumination unit side and the rotation axis on the reticle selection unit side are separated from each other by pulling the reticle selection unit, and then the reticle selection unit is rotated so as to couple a desired convex-concave corresponding to the distance to the point of impact of the convex-concave portion of the rotation axis on the illumination unit side with the protrusion of the rotation axis on the reticle selection unit side.

5. A dot sighting device comprising:
a reflection mirror;
an illumination having a LED irradiating light to the reflection mirror and a transparent reticle that is positioned in front of the LED and forms a dot image by transmitting the light irradiated from the LED;
a fixed grille formed on a lower portion of the dot sighting device, wherein the dot sighting device is attached to and detached from a mount for a heavy machine gun by the fixed grille;
wherein the upper plate comprises a protective window; a reflection mirror; and an illumination unit, and
wherein the lower plate comprises: a fixed grille formed on a lower portion of the dot sighting device;
a bullet path adjustment handle installed at a side surface of the dot sighting device;
a click control bolt that connects the upper and lower plates and sets an origin point;
a bullet path adjustment body that is accommodated in a bullet path adjustment body accommodation unit formed in the lower plate and is connected to the upper plate by fixing an end on the lower plate side of the click control bolt to an upper portion of a plate connection rotation axis penetrating a side surface of the lower plate;

a bullet path adjustment axis that comprises a bullet path adjustment portion positioned on a bullet path adjustment axis contact portion at an end of the bullet path adjustment body, and penetrates the lower plate, thereby being connected to the bullet path adjustment handle;

a connection pin of the bullet path adjustment body and the lower plate, penetrating the other end of the bullet path adjustment body and the lower plate from a side surface of the lower plate, thereby connecting the bullet path adjustment body and the lower plate; and a spring accommodation portion formed in a top surface of the lower plate on the bullet path adjustment axis contact portion side based on the connection pin, wherein the spring accommodation portion accommodates a spring, thereby pushing the upper plate and the lower plate apart from each other, wherein the bullet path adjustment body is rotatable around the upper/lower plate connection rotation axis, wherein the bullet path adjustment axis contacts a top surface of the bullet path adjustment axis contact portion of the bullet path adjustment body, and comprises a bullet path adjustment portion having a plurality of contact surfaces each having a different normal distance from the center of the bullet path adjustment axis, corresponding to a distance to a target, wherein, in the bullet path adjustment portion, by rotating the bullet path adjustment handle, a contact surface corresponding to a distance to a desired target contacts the bullet path adjustment axis contact portion.

6. A dot sighting device comprising:

a reflection mirror;

an illumination having a LED irradiating light to the reflection mirror and a transparent reticle that is positioned in front of the LED and forms a dot image by transmitting the light irradiated from the LED;

a fixed grille formed on a lower portion of the dot sighting device, wherein the dot sighting device is attached to and detached from a mount for a heavy machine gun by the fixed grille;

the dot sighting device further comprising a reticle selection unit connected to the illumination unit, wherein the transparent reticle is formed on a plane perpendicular to a reticle rotation axis that extends from the reticle selection unit and penetrates the illumination unit, thus being able to rotate based on the reticle rotation axis by rotation of the reticle selection unit, and a plurality of reticles are formed on the transparent reticle on the same radius axis around the reticle rotation axis, wherein the reticles are formed closer to the reticle rotation axis as a distance to the corresponding point of impact is farther, and one of the reticles is selected by rotating the reticle rotation unit according to a distance to the target wherein the reticle rotation axis comprises, around a reticle rotation connection axis, a rotation axis on an illumination unit side having a convex-concave portion with a plurality of convexes-concaves corresponding to a distance to a point of impact; and a rotation axis on a reticle selection unit side that has protrusions coupled to desired convexes-concaves of the convex-concave portion on an end thereof and the other end of which is connected to the transparent reticle, wherein the rotation axis on the illumination unit side and the rotation axis on the reticle selection unit side are separated from each other by pulling the reticle selection unit, and then the reticle selection unit is rotated so as to couple a desired convex-concave corresponding to the distance to the point of impact of the convex-concave portion of the rotation axis on the illumination unit side with the protrusion of the rotation axis on the reticle selection unit side.

7. The dot sighting device of claim 1, wherein the second surface comprises an aspheric surface having a conic coefficient.

* * * * *